July 23, 1968   J. B. ULAM   3,393,445

MANUFACTURE OF STAINLESS CLAD STEEL

Filed May 13, 1965

INVENTOR
John B. Ulam

United States Patent Office 3,393,445
Patented July 23, 1968

3,393,445
MANUFACTURE OF STAINLESS CLAD STEEL
John B. Ulam, Canonsburg, Pa., assignor to Composite Metal Products, Inc., a corporation of Pennsylvania
Filed May 13, 1965, Ser. No. 455,539
4 Claims. (Cl. 29—470.9)

ABSTRACT OF THE DISCLOSURE

A method of forming stainless clad carbon steel is provided in which a pack is formed with a carbon steel center and stainless exterior and closed by carbon steel inserts around the edges welded by a dual weld and evacuated or containing a non-oxidzing gas and the pack is heated and rolled.

---

This invention relates to the manufacture of stainless clad steel and particularly to an assembly of stainless steel and carbon steel and a method of manufacturing composite strip, sheet and plate having a stainless steel face and carbon steel core.

Many attempts have been made in the past to prepare stainless clad carbon steel with indifferent success. These practices have, in general, involved forming a pack in which an inner core of carbon steel is overlaid by a larger sheet of stainless steel on either side and surrounded by stainless steel bars along the edges welded to the stainless sheets to enclose the carbon steel core. This technique is expensive but was believed essential in order to obtain a satisfactory stainless outer shell free from leaks during the rolling operation. I have discovered a unique practice which eliminates the need for stainless bars and produces a much superior product of consistent high quality.

In a preferred practice of my invention, I clean the surfaces of stainless steel and carbon sheet to be joined by mechanical means, preferably by brushing, to remove all foreign matter, grease, oxidation and the like to expose a clean unoxidized surface. The surfaces of the carbon steel core and the stainless cladding are brought together with the external sheet extending beyond the edges of the core. Bars of Type 1006 to 1010 carbon steel preferably beveled at the outer edges are placed beneath the overhanging edge of the external sheet and the edge of the core to make a complete sandwich. The bars are welded to the overhanging external sheet around the entire edges using a weld rod of Type 1006 to 1010 carbon steel or Type 304 or 308 stainless, following which an overlapping weld using a like electrode is applied over the first weld connecting the bar and the external steel cladding, all the while controlling the weld to provide ferritic conditions. The area between the steel core and external clad is preferably evacuated but may be filled with inert gas at subatmospheric pressure, the pack is heated and rolled to produce a composite product. I have found that it is essential that bars of Type 1006 to 1010 carbon steel be used in order to obtain the unique result here taught.

In the foregoing general specification I have set out certain objects, purposes and advantages of my invention. Other objects, purposes and advantages will be apparent from the following description and the accompanying drawings in which, FIGURE 1 is a fragmentary isometric view partly cut away of a forward corner of a pack according to my invention designed to produce a double clad carbon steel core clad with stainless steel;

Figure 1:
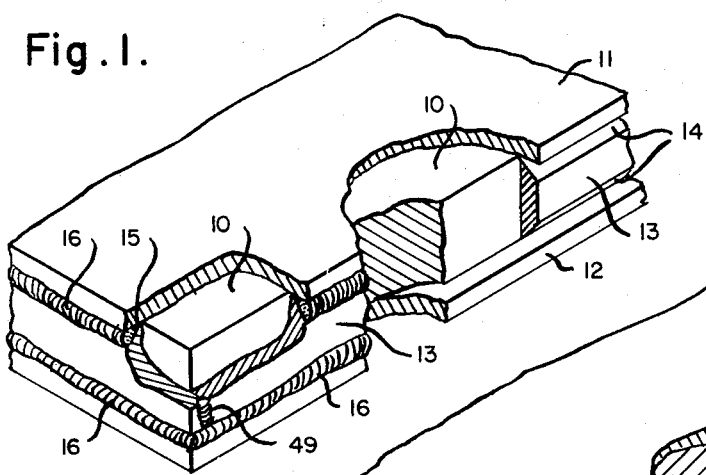
Figure 2:
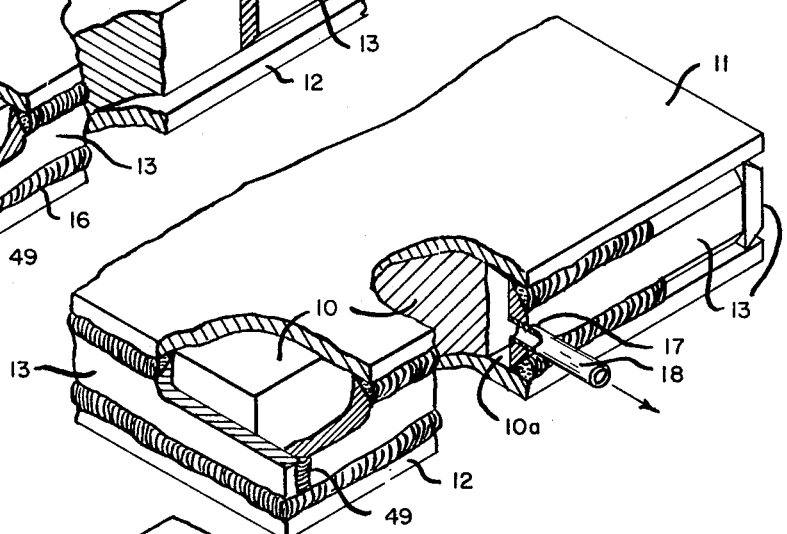
FIGURE 2 is a fragmentary isometric view partly cut away of the rear end of the pack according to FIGURE 1.

Referring to the drawings, I have illustrated in FIGURES 1 and 2 a carbon steel core 10, an upper stainless clad sheet 11 and a lower stainless clad sheet 12, both stainless sheets being slightly larger all around than the carbon steel sheet, all of said sheets having been mechanically cleaned by brushing prior to assembly as described in my Patents 2,718,690 and 2,758,368. Bars 13 of Type 1006 carbon steel of such size as to fit between the stainless sheets 11 and 12 are beveled at the edges 14 and inserted between sheets 11 and 12 around core 10 after cleaning the surfaces adjacent the core. The bars 13 should have a width between 0.750" and 0.250". The bevels are partially filled with weldment 15 using the MIG process and a Type 304 or Type 308 stainless or a low carbon electrode $\frac{1}{16}$" to $\frac{1}{8}$" in diameter. Care should be taken to regulate the weld heat to prevent creation of a semi-stainless area in the weld zone. The slab is next submerged arc welded completely around the periphery to deposit a weldment 16 of Type 304 or 308 stainless steel or in the case of low carbon weld 15, of low carbon steel sufficient to fill the gap between the bar, the MIG weld and the cladding plate. The heat should be controlled so as to provide a slightly ferritic condition in the weldment. A space 10a should be left between the rear bar 13 and the core 10. This space 10a should be about 1" in assemblies less than 3" thick and 2" in assemblies larger than 3" thick to account for the difference in coefficient of expansion of carbon and stainless steel at elevated temperatures. All corners are welded as at 49 to form a completely sealed unit.

A hole 17 is drilled in one end bar 13 and fitted with a valve 18 through which the interior of the assembly may be evacuated. While evacuation is preferred, an inert atmosphere, preferably at subatmospheric pressure, may be placed in the assembly replacing the air which might otherwise be trapped therein.

The pack, assembled as above, is heated to a temperature of about 1950° F. to 2300° F. At these temperatures the external plates and bars are forced tightly against the core due to the higher atmospheric pressure outside the pack. Since the assembly is hot, both the bars and plates are deformed by atmospheric pressure. This pressure is sufficient to create a degree of bonding which aids the ultimate rolling and bonding operation hot rolled to the desired reduction. The rolling step causes the carbon steel core to weld to the carbon bars along its edges and at the same time to weld to the cladding of stainless steel to form a complete composite assembly free from the problems of cracking along the edges with resultant oxidation which characterized prior art processes.

Figure 3:
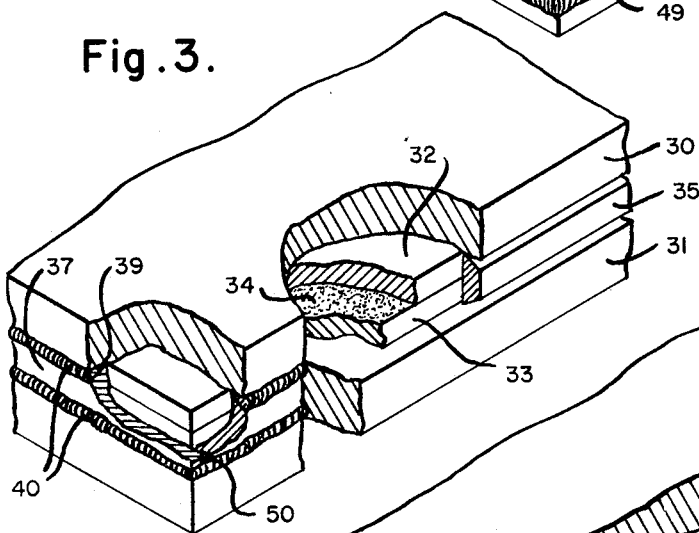
FIGURE 3 is a fragmentary isometric view partly cut away of a forward corner of a preferred form of pack designed to produce single clad carbon with stainless steel.
Figure 4:
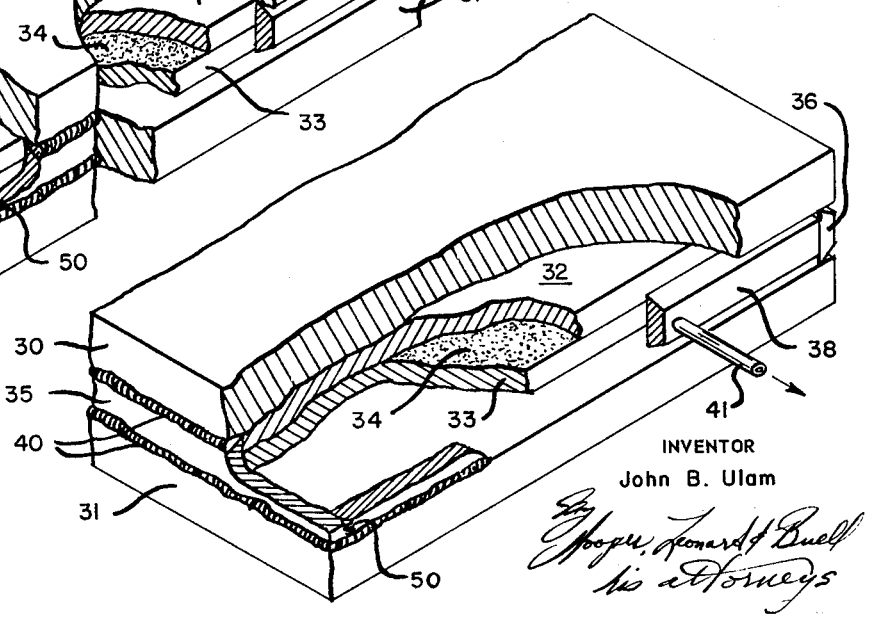
FIGURE 4 is a fragmentary isometric view partly cut away of the rear end of an assembled pack according to FIGURE 3.

In FIGURES 3 and 4, I have illustrated a form of pack assembly made up of spaced carbon steel plates 30 and 31 having a pair of stainless steel plates 32 and 33 therebetween. The stainless plates 32 and 33 are separated by a separating or parting compound 34. The carbon steel plates 30 and 31 overlie the stainless plates on all edges. Side bars 35 and 36 and end bars 37 and 38 are provided to substantially fill the space beneath the overhangs. The bars 35, 36, 37 and 38 are preferably beveled at their outer edges and the base of the bevels provided with weldments 39 as in FIGURES 1 and 2.

An overlay weldment 40 fills the bevel and the area between the bars and the plates 30 and 31 to form a seal. All bars are welded 50 at the corners to provide a completely sealed unit. The rear end bar 38 is provided with a valve 41 welded in place, through which the interior of the assembly may be evacuated.

The pack as assembled is heated and rolled as described in connection with the pack of FIGURES 1 and 2.

In the processing of packs assembled as illustrated and described in FIGURES 3 and 4 the separating or parting compound is of particular significance. A separating compound is painted on the abutting surfaces of the stainless steel claddings to keep them from sticking, adhering or bonding together. It is extremely important that the separating compound be effective as any sticking between the stainless steel components defeats the purpose of producing in a 4-ply method.

Until the present process was devised, single armor in 4-ply construction and in coil form had never been successfully manufactured.

When rolling slabs of single armor into strip, an original billet of almost 4" to 10" thick is used.

The actual reduction during hot rolling is as much as 100 to one which has been the main reason for lack of success in the past. Prior art was incapable of producing a separating medium that would keep the materials from sticking in such great reduction.

A separating compound is preferably produced as follows: A slurry of one part lacquer+2 parts thinner +one to 1½ parts chromium oxide powder (240 to 400 mesh) is mixed and the chromium oxide is kept in suspension at all times even during the actual application step.

It has been found that as many as six applications must be applied on the stainless steel surface to keep it from adhering. Each application is permitted to thoroughly dry prior to the next, which is always applied at right angles to the previous application.

The finer the mesh of the chromium oxide, the higher or smoother the finish of the stainless steel becomes. During the application of the separating compound, the thinner combined with the lacquer produces a hard paint-like surface. The thinner volatilizes leaving the lacquer hard and solid. During the heating operation the lacquer further breaks down into its chemical constituents thus rendering an inert atmosphere within the pack.

The remaining chromium oxide becomes quite hard; however, since the binder of lacquer and thinner has completely volatilized, the chromium oxide in powder state then appears to extend with the material as it is reduced and extended during rolling. The powdered state of the chromium oxide is most important as it permits complete movement of the separating compound thus keeping any new surfaces that are created from sticking to an additional surface created on the other cladding.

The design of my assembly coupled with the use of the subatmospheric inert atmosphere or vacuum and, of course, the mechanical cleaning are the reasons for such great success in producing stainless clad carbon steel. No other process combines all of these areas thus yielding a complete bond. I also believe that the construction of my assembly is such that it permits the manufacture of stainless clad steel on any type of mill and under any draft sequence that a steel producer would want to follow. It is well known in prior art that special rolling reductions and pass techniques had to be followed to yield usable product. I, however, can draft or reduce my assemblies as great as, or greater than, the drafting used for solid stainless steel without breakage. This again permits my process to be economical as compared with many processes which required reheating and rerolling and minimum drafting so that the assembly would not break up during the rolling operation.

After I have finished rolling the hot band, all that is necessary is to trim off the weld and not the bar; and when carbon steel weld wire is used, only a very slight edge trim is required, the same as that used in the production of solid stainless steel.

When stainless side bars are used, they do not bond to the carbon steel core since there is insufficient sideways pressure to cause bonding. This permits the core to overroll as previously stated and also permits a cooling effect to occur on the stainless steel weld and edge of the bar. This always caused excessive edge cracking and sometimes failure of the slab. I have found by using the carbon bars, that cooling does not occur nearly so rapidly as the bar bonds to the core thus permitting heat to be transferred from the hot core into the side bar. This allows the hot rolling to be done when the bars are at red heat. Further, it has been found that the stainless weld to a stainless bar sometimes goes through a hot short temperature range where the resulting weld has no ductility whatsoever, thus it breaks up.

While I have illustrated and described certain preferred practices and embodiments of my invention it will be understood that this invention may be otherwise embodied within the scope of the following claims.

I claim:

1. A method of forming stainless steel clad carbon steel comprising the steps of mechanically cleaning the surfaces of a carbon steel core and the surface of a stainless steel sheet adjacent said carbon steel core, said stainless sheet extending beyond said core on all edges, placing an insert of Type 1006 to 1010 carbon steel along each edge of said core in contact with the core and stainless sheet, forming a first weldment of Type 304 or Type 308 stainless steel at the junction of said insert and the stainless sheet, forming a second weldment of Type 304 or Type 308 stainless steel by submerged arc welding over the entire exposed area of said first weldment, creating a subatmospheric pressure non-oxidizing condition within the space between the stainless steel sheet, and the carbon steel inserts, heating to a temperature of about 1950° F.–2300° F. and rolling.

2. A method of forming stainless steel clad carbon steel comprising the steps of mechanically cleaning the surfaces of a carbon steel core and the surface of a stainless steel sheet adjacent said carbon steel core, said stainless sheet extending beyond said core on all edges, placing an insert of Type 1006 carbon steel along each edge of said core in contact with the core and stainless sheet, forming a first weldment of Type 304 or Type 308 stainless steel at the junction of said insert and the stainless sheet, forming a second weldment of Type 304 or Type 308 stainless steel by submerged arc welding over the entire exposed area of said first weldment, creating a subatmospheric non-oxidizing condition within the space between the stainless steel sheet, and the carbon steel inserts, heating to a temperature of about 1950° F.–2300° F. and rolling.

3. A method of forming stainless steel clad carbon steel comprising the steps of mechanically cleaning a surface of each sheet of a pair of carbon steel sheets and a surface of each of a pair of stainless steel sheets, assemblying the cleaned faces of a sheet of each of the carbon steel and the stainless steel sheets together with the uncleaned surfaces of the stainless steel together separated by a parting compound so that the carbon steel sheets form the outer spaced surfaces, said carbon sheets extending beyond said stainless core on all edges, placing an insert of Type 1006 to 1010 carbon steel along each edge of said core in contact with the surfaces of the carbon steel sheets, forming a first weldment of 1006 to 1010 carbon steel at the junction of said insert and the carbon steel sheet, forming a second weldment of 1006 to 1010 carbon steel by submerged arc welding over the entire exposed area of said first weldment, creating a subatmospheric pressure non-oxidizing condition within the space between the carbon steel sheets, and the carbon steel inserts, heating to a temperature of about 1950° F.–2300° F. and rolling.

4. A method of forming stainless steel clad carbon steel comprising the steps of mechanically cleaning a surface of each sheet of a pair of steel sheets and a surface of each sheet of a pair of stainless steel sheets, assembling a sheet of carbon steel and a sheet of stainless steel in a pack with one sheet forming a core and the other an outer layer with cleaned faces together, placing one of a like other sheet and a like pack on the opposite side of said one sheet forming a core with a parting compound there between so that the outer sheets are identical in composition, said outer sheets extending beyond said core on all edges, placing an insert of Type 1006 carbon steel along each edge of said core in contact with the core and said outer sheets, forming a first weldment of a material from the group consisting of Type 304 or Type 308 stainless steel and 1006 to 1010 carbon steel at the junction of said insert and the outer sheets, forming a second weldment from said group by submerged arc welding over the entire exposed area of said first weldment, creating a subatmospheric pressure non-oxidizing condition within the space between the outer steel sheets, and the carbon steel inserts, heating to a temperature about 1950° F.–2300° F., and rolling.

References Cited

UNITED STATES PATENTS

| | | | |
|---|---|---|---|
| 1,886,615 | 11/1932 | Johnson | 29—471.5 X |
| 2,018,725 | 10/1935 | Johnson | 29—471.5 X |
| 2,468,206 | 4/1949 | Keene | 29—471.5 X |
| 2,704,883 | 3/1955 | Hamilton | 29—471.5 |
| 2,718,690 | 9/1955 | Ulam | 29—471.5 |
| 2,745,172 | 5/1956 | Townsend | 29—471.5 X |
| 2,758,368 | 8/1956 | Ulam | 29—471.5 |
| 2,820,286 | 1/1958 | Andrus | 29—471.5 |
| 3,001,059 | 9/1961 | Jones | 29—471.5 X |

FOREIGN PATENTS 280,518    9/1928    Great Britain.

OTHER REFERENCES

Metals Handbook, 1948 edition, edited by Lyman, published by American Society for Metals, pp. 307, 372–373, 545–546.

A Dictionary of Metallurgy by A. D. Merriman, published in 1958 by Macdonald and Evans Ltd.

JOHN F. CAMPBELL, *Primary Examiner.*

R. F. DROPKIN, *Assistant Examiner.*

UNITED STATES PATENT OFFICE
CERTIFICATE OF CORRECTION

Patent No. 3,393,445                                                July 23, 1968

John B. Ulam

It is certified that error appears in the above identified patent and that said Letters Patent are hereby corrected as shown below:

Column 1, line 36, "steel" should read -- sheet --.
Column 5, line 5, after "of", third occurrence, insert -- carbon --.

Signed and sealed this 23rd day of December 1969.

(SEAL)
Attest:

Edward M. Fletcher, Jr.                                  WILLIAM E. SCHUYLER, JR.
Attesting Officer                                              Commissioner of Patents